(12) United States Patent
Gellner et al.

(10) Patent No.: US 11,775,543 B1
(45) Date of Patent: Oct. 3, 2023

(54) HEAPSORT IN A PARALLEL PROCESSING FRAMEWORK

(71) Applicant: SAP SE, Walldorf (DE)

(72) Inventors: Alexander Gellner, Karlsruhe (DE);
Paul Willems, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/723,949

(22) Filed: Apr. 19, 2022

(51) Int. Cl.
*G06F 16/248* (2019.01)
*G06F 16/23* (2019.01)

(52) U.S. Cl.
CPC ............ *G06F 16/248* (2019.01); *G06F 16/23* (2019.01)

(58) Field of Classification Search
CPC .............................. G06F 16/248; G06F 16/23
USPC .......................................................... 707/722
See application file for complete search history.

(56) References Cited

U.S. PATENT DOCUMENTS

| | | | | |
|---|---|---|---|---|
| 6,832,378 | B1 * | 12/2004 | Beatty, III | ............ G06F 9/4843 718/104 |
| 9,170,848 | B1 * | 10/2015 | Goldman | ............ G06F 16/2228 |
| 10,496,659 | B2 * | 12/2019 | Lin | .................... G06F 16/24532 |
| 10,671,625 | B2 * | 6/2020 | Schulze | ................ G06F 16/248 |
| 11,620,164 | B1 * | 4/2023 | Karis | ..................... G06F 9/5083 718/104 |
| 11,625,401 | B2 * | 4/2023 | Willems | .............. H04L 67/1091 707/769 |
| 2010/0257538 | A1 * | 10/2010 | Zhao | ..................... G06F 9/5066 712/220 |
| 2019/0129843 | A1 * | 5/2019 | Wu | ...................... G06F 12/0276 |
| 2020/0293332 | A1 * | 9/2020 | Schlegel | ............... G06F 9/3887 |
| 2022/0100715 | A1 * | 3/2022 | Lee | ....................... G06F 16/258 |

* cited by examiner

*Primary Examiner* — Joshua Bullock
(74) *Attorney, Agent, or Firm* — Mintz Levin Cohn Ferris Glovsky and Popeo, P.C.

(57) ABSTRACT

A method for performing a parallelized heapsort operation may include updating, by a first worker thread, a first buffer while a second worker thread updates a second buffer in parallel. The first worker thread may update the first buffer by adding, to the first buffer, elements from a first partition of a dataset. The second worker thread may update the second buffer by adding, to the second buffer, elements from a second partition of the dataset. Upon the first buffer reaching a threshold size, the first worker thread may acquire a lock for the first worker thread to update a heap based on the first buffer while the second worker thread is prevented from updating the heap based on the second buffer. A result of a top k query comprising a k quantity of smallest elements from the dataset may be generated based on the heap.

20 Claims, 5 Drawing Sheets

HEAPSORT IN A PARALLEL PROCESSING FRAMEWORK

TECHNICAL FIELD

The subject matter described herein relates generally to database processing and more specifically to performing a heapsort operation with parallel processing.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for a parallelized heapsort operation. In some example embodiments, there is provided a system that includes at least one processor and at least one memory. The at least one memory may include program code that provides operations when executed by the at least one processor. The operations may include: updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset; upon the first buffer reaching a threshold size, acquiring, by the first worker thread, a lock for the first worker thread to update a heap based on the first buffer while the second worker thread is prevented from updating the heap based on the second buffer; upon acquiring the lock, updating, by the first worker thread, the heap; and generating, based at least on the heap, a result of a top k query comprising a k quantity of smallest elements from the dataset.

In some variations, one or more features disclosed herein including the following features can optionally be included in any feasible combination. The first worker thread may update the heap by at least adding, to the heap, one or more elements from the first buffer until the heap reaches the threshold size, upon the heap reaching the threshold size, comparing a first element remaining in the first buffer with a current top element in the heap, in response to the first element being smaller than the current top element of the heap, replacing the current top element of the heap with the first element, and in response to the first element being greater than or equal to the current top element of the heap, omitting the first element without updating the heap.

In some variations, the first worker thread may continue to update the heap until having examined every element in the first buffer.

In some variations, the first worker thread may further update the heap by at least comparing a second element remaining in the first buffer with the current top element in the heap, in response to the second element being smaller than the current top element of the heap, replacing the current top element of the heap with the second element, and in response to the second element being greater than the current top element of the heap, omitting the second element without updating the heap.

In some variations, the top k query may be associated with an offset n. The threshold size of the heap may include a (k+n) quantity of elements. The result of the top k query may include the k quantity of the smallest elements after an initial n quantity of elements in the heap.

In some variations, the operations may further include: upon having examined every element within the first buffer, releasing, by the first worker thread, the lock.

In some variations, the first worker thread may update a current top element of the heap after having examined every element in the first buffer but before releasing the lock.

In some variations, the first worker thread may update the first buffer by at least omitting, from being added to the first buffer, any element from the first partition that is greater than the current top element of the heap. The second worker thread may update the second buffer by at least omitting, from being added to the second buffer, any element from the second partition that is greater than the current top element of the heap.

In some variations, the heap may include a max-heap in which each internal node is associated with a first element that is greater than or equal to a second element of associated with one or more corresponding children nodes.

In some variations, the operations may further include: upon the second buffer reaching the threshold size, acquiring, by the second worker thread, the lock.

In some variations, the dataset may include one or more database tables.

In some variations, the first partition of the dataset and the second partition of the dataset may be stored at different nodes of a database.

In another aspect, there is provided a method for a parallelized heapsort operation. The method may include: updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset; upon the first buffer reaching a threshold size, acquiring, by the first worker thread, a lock for the first worker thread to update a heap based on the first buffer while the second worker thread is prevented from updating the heap based on the second buffer; upon acquiring the lock, updating, by the first worker thread, the heap; and generating, based at least on the heap, a result of a top k query comprising a k quantity of smallest elements from the dataset.

In some variations, one or more features disclosed herein including the following features can optionally be included in any feasible combination. The first worker thread may update the heap by at least adding, to the heap, one or more elements from the first buffer until the heap reaches the threshold size, upon the heap reaching the threshold size, comparing a first element remaining in the first buffer with a current top element in the heap, in response to the first element being smaller than the current top element of the heap, replacing the current top element of the heap with the first element, and in response to the first element being greater than or equal to the current top element of the heap, omitting the first element without updating the heap.

In some variations, the first worker thread may continue to update the heap until having examined every element in the first buffer.

In some variations, the first worker thread may further update the heap by at least comparing a second element remaining in the first buffer with the current top element in the heap, in response to the second element being smaller than the current top element of the heap, replacing the current top element of the heap with the second element, and in response to the second element being greater than the current top element of the heap, omitting the second element without updating the heap.

In some variations, the top k query may be associated with an offset n. The threshold size of the heap may include a (k+n) quantity of elements. The result of the top k query may include the k quantity of the smallest elements after an initial n quantity of elements in the heap.

In some variations, the method may further include: upon having examined every element within the first buffer, releasing, by the first worker thread, the lock.

In some variations, the first worker thread may update a current top element of the heap after having examined every element in the first buffer but before releasing the lock. The first worker thread may update the first buffer by at least omitting, from being added to the first buffer, any element from the first partition that is greater than the current top element of the heap. The second worker thread may update the second buffer by at least omitting, from being added to the second buffer, any element from the second partition that is greater than the current top element of the heap.

In another aspect, there is provided a computer program product including a non-transitory computer readable medium storing instructions. The instructions may cause operations may executed by at least one data processor. The operations may include: updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset; upon the first buffer reaching a threshold size, acquiring, by the first worker thread, a lock for the first worker thread to update a heap based on the first buffer while the second worker thread is prevented from updating the heap based on the second buffer; upon acquiring the lock, updating, by the first worker thread, the heap; and generating, based at least on the heap, a result of a top k query comprising a k quantity of smallest elements from the dataset.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a parallelized heapsort operation for responding to an top k query, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
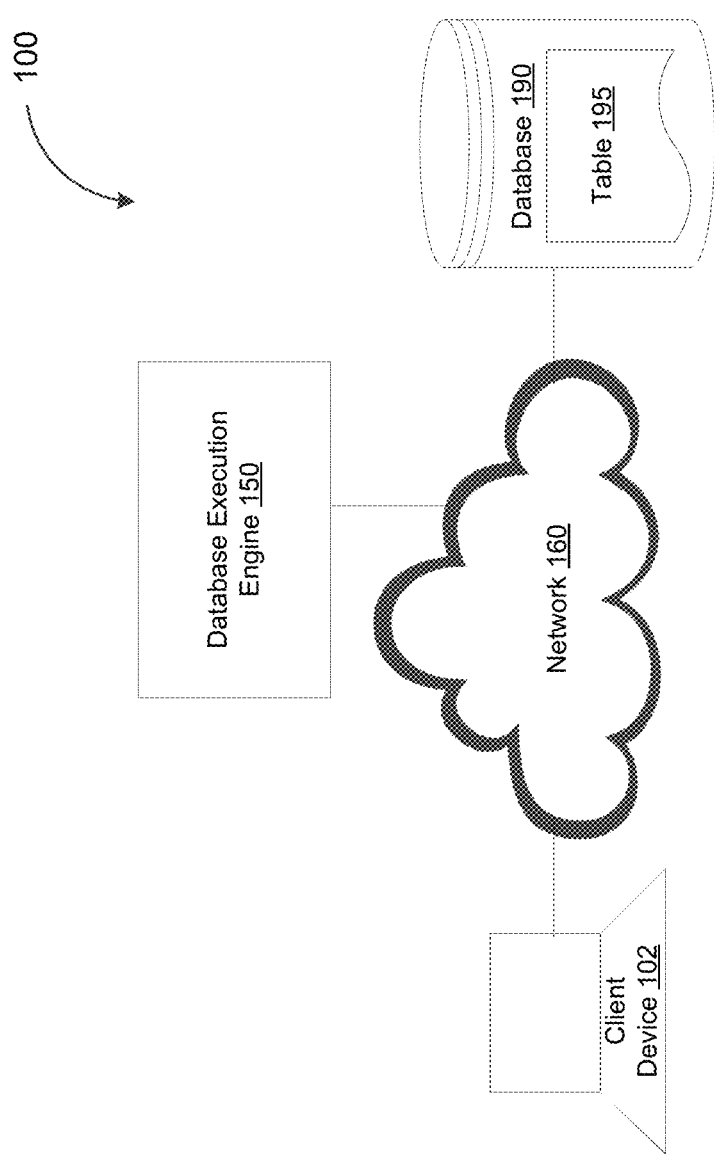
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" may refer to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In such a parallelization framework, a data execution engine may divide a query accessing a dataset (e.g., including one or more database tables) into a quantity of tasks determined based on the quantity of time required to execute the query on a portion the dataset having a predetermined size. As such, if a large quantity of time is required to execute the query on the portion of the dataset, the data execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the data execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads. That is, if the data execution engine detects an insufficient progress, the data execution engine may allocate additional worker threads to perform the tasks associated with the query.

A top k query executed on a dataset (e.g., including one or more database tables stored in a database) may return a sorted list of a k quantity of the smallest elements from the unsorted elements in the dataset. Upon receiving a top k query, the data execution engine may perform a heapsort operation in order to generate the sorted list of the k quantity of elements from the unsorted elements in the dataset. When the top k query is executed in a sequential fashion (e.g., without parallel processing), the data execution engine may perform the heapsort operation by updating a heap set to a threshold size of k quantity of elements with incoming elements from the dataset. For example, the data execution engine may continue to add incoming elements to the heap until the heap reaches the threshold size of k quantity of elements. Thereafter, the data execution engine may compare an incoming element to the top element (e.g., the root node) of the heap. If an incoming element is smaller than the current top element of the heap, the heap is updated by replacing the current top element of the heap with the incoming element before restoring (e.g., via a sift-down operation) the heap property that the element associated with each internal node (e.g., of the corresponding binary tree) is greater than or equal to the elements of the corresponding children nodes. Alternatively, if the incoming element is larger than or equal to the current top element of the heap, the data execution engine may omit that incoming element without any updates to the heap. The data execution engine may continue this process until every element of the dataset have been evaluated.

As noted, parallel processing may improve throughput at the database. However, a conventional heapsort cannot be used in a parallel processing framework in which multiple worker threads, each processing a portion of the dataset, may access the heap at least because race conditions and false results may arise in the absence of synchronization primitives to control access to the heap. As such, in some example embodiments, the data execution engine may perform a parallelized heapsort in order to generate the results of a top k query. While a top k query executed on a dataset may return a sorted list of a k quantity of the smallest elements from the unsorted elements in the dataset, a bottom k query executed on the dataset may return a sorted list of a k quantity of the largest elements from the unsorted elements in the dataset. Accordingly, it should be appreciated that the data execution engine may perform a variation of the parallelized heapsort operation in order to generate the results of a bottom k query.

In some example embodiments, a parallelized heapsort operation may be performed by updating a heap set to a threshold size of k quantity of elements. For example, the heap may be a max-heap, which may be a binary tree in which the element associated with each internal node is greater than or equal to the elements of the corresponding children nodes. To avoid race conditions and false results, access to the heap may be synchronized using a lock. Moreover, instead of acquiring the lock for each incoming element of the dataset, each worker thread may first update a buffer with candidate elements for updating the heap. Accordingly, once the buffer of a worker thread reaches a threshold size, that worker thread may acquire the lock for the heap and update the heap based on the candidate elements included in its buffer. Doing so may reduce the overhead typically associated with synchronization, such as the overhead associated with requesting the lock, waiting for the lock to release, and releasing the lock.

In some example embodiments, the computational efficiency of a parallelized heapsort operation may be further increased by storing the current top element of the heap. For example, the current top element of the heap may be stored after a worker thread updates the heap and before that worker thread releases the lock on the heap. The current top element of the heap may be used to prune updates to the buffer of each worker thread. For example, a worker thread may add an incoming element to its buffer if that incoming element is smaller than the current top element of the heap. Otherwise, if the incoming element is larger than or equal to the current top element of the heap, the worker thread may omit that incoming element without any updates to the buffer.

In some example embodiments, the parallelized heapsort may be performed with a single global heap and a lock to synchronize access to the heap by multiple worker threads. Performing the parallelized heapsort with a single global heap may be more computationally efficient than performing the parallelized heapsort with each worker thread having its own local heap at least because the synchronization overhead associated with a single global heap is replaced with the cost of merging individual heaps while still preserving the top k elements across all heaps. Furthermore, performing the parallelized heapsort with multiple local heaps may give rise to a far larger quantity of heap updates, which is directly reflected in a higher processor service time. This phenomenon may be attributed to the saturation of individual heaps over time, meaning that far more heap updates occur at the beginning of the heapsort operation than at the end of the heapsort operation. Thus, with multiple local heaps, the quantity of heap updates far outnumbers that associated with a single global heap because the number of heap updates required to reach the aforementioned saturation point is multiplied over the number of local heaps.

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicative coupled via a network 160. The one or more databases 190 may include a variety of relational databases including, for example, an in-memory database, a column-based database, a row-based database, and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
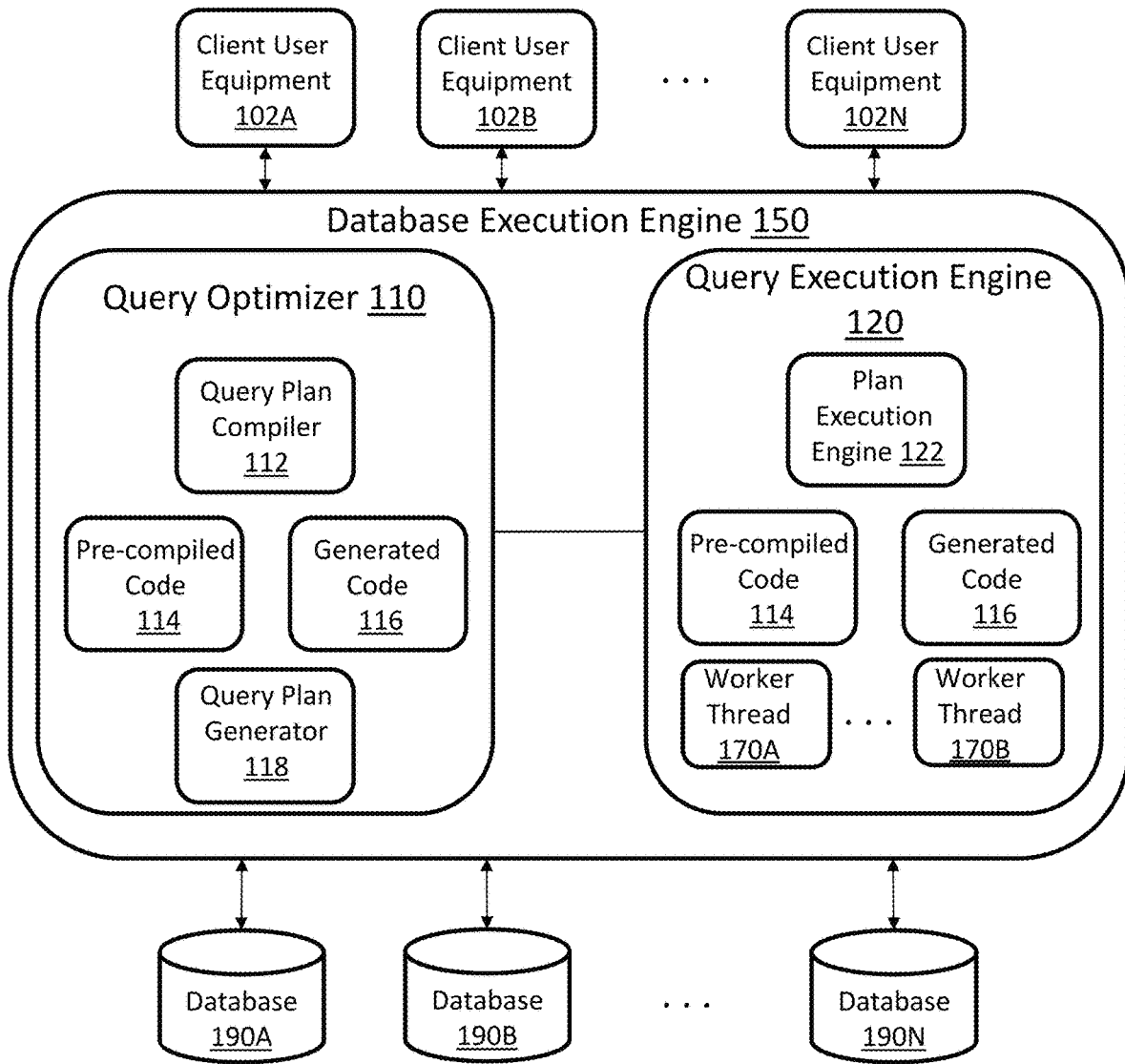
FIG. 2 depicts a block diagram illustrating an example of a database execution engine, in accordance with some example embodiments.

FIG. 2 depicts a block diagram illustrating an example of the data execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices 102A-N, may send a query via the data execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190 include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190. Moreover, the query execution engine 120 may perform other operations including rule-based operations, such as joins and projections, as well as filtering, group by, multi-dimensional analysis, and/or the like to reduce the processing burden on the database layer. In this way, the query execution engine 120 may execute these and other complex operations, while the one or more databases 190 can perform simpler operations to reduce the processing burden at the one or more databases 190.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

Figure 3:
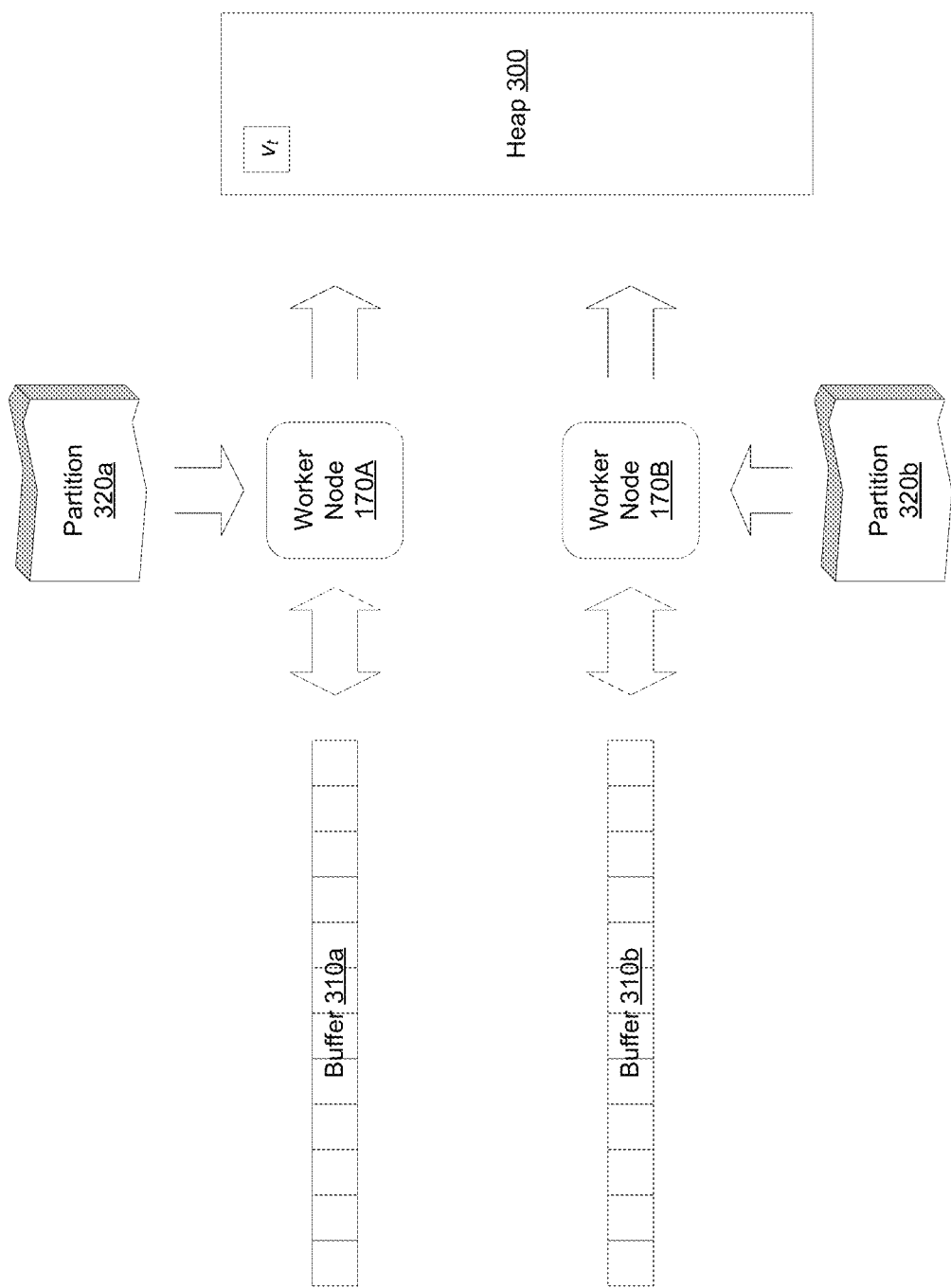
FIG. 3 depicts a schematic diagram illustrating an example of a parallelized heapsort operation, in accordance with some example embodiments.

In some example embodiments, the database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the data execution engine 150 may divide the database table 195 into multiple partitions by applying one or more of a hash partitioning, round-robin partitioning, and range partitioning. For example, as shown in FIG. 3, the database table 195 may be divided into a first partition 165a, a second partition 165b, and a third partition 165c. Moreover, the first partition 165a may be stored at the first database 190A, the second partition 165b may be stored at the second database 190B, and the third partition 165c may be stored at the third database 190C.

To execute a query accessing a dataset that includes, for example, the database table 195, the data execution engine 150 may divide the query into a quantity of tasks determined based on the quantity of time required to execute the query on a portion the dataset having a predetermined size. Accordingly, if a large quantity of time is required to execute the query on the portion of the dataset, the data execution engine 150 may determine that the query is computationally intensive and thus divide the query into a larger quantity of smaller tasks. One or more of the worker threads 170 (e.g., a first worker thread 170A, a second worker thread 170B, and/or the like) may be allocated to perform the tasks associated with the query. The quantity of the worker threads 170 the data execution engine 150 allocates may be determined based on the progress of the query observed at various time intervals. For example, upon allocating an initial quantity of the worker threads 170 to perform the tasks associated with the query, the data execution engine 150 may monitor the progress of the query (e.g., the quantity of tasks that have not been performed by any the worker threads 170, the quantity of tasks that have been performed relative to the total quantity of outstanding tasks, and/or the like) to determine whether to increase that initial quantity of the worker threads 170.

In some example embodiments, the data execution engine 150 may respond to a top k requesting a k quantity of the smallest elements in the dataset by performing a parallelized heapsort operation in which the first worker thread 170A and the second worker thread 170B each operate on a portion of the dataset. For example, the parallelized heapsort operation may be performed by the first worker thread 170A and the second worker thread 170B each updating a heap (e.g., a global heap) set to a threshold size of k quantity of elements.

To avoid race conditions and false results, access to the heap may be synchronized using a lock. Moreover, instead of acquiring the lock for each incoming element of the dataset, each worker thread 170 may first update a buffer with candidate elements for updating the heap. Once the buffer of the first worker thread 170A reaches a threshold size, for example, the first worker thread 170A may acquire the lock for the heap and update the heap based on the candidate elements included in its buffer. Similarly, the second worker thread 170B may also acquire the lock for the heap once the buffer for the second worker thread 170B reaches the threshold size.

To further illustrate, FIG. 3 depicts a schematic diagram illustrating an example of parallelized heapsort in which the first worker thread 170A and the second worker thread 170B updates a heap 300, in accordance with some example embodiments. As shown in FIG. 3, the first worker thread 170A may be update a first buffer 310a based on incoming elements from a first partition 320a of a dataset while the second worker thread 170B may update a second buffer 310b based on incoming elements from a second partition 320b of the dataset. The updating of the first buffer 310a and the updating of the second buffer 310b may be performed in parallel. For example, the first worker thread 170A may add, to the first buffer 310a, incoming elements from the first partition 320a until the first buffer 310a reaches a threshold size, at which point the first worker thread 170A may acquire a lock for accessing the heap 300. Meanwhile, the second worker thread 170B may add incoming elements from the second partition 320b to the second buffer 310b until the second buffer 310b reaches the threshold size, at which point the second worker thread 170B may acquire the lock for accessing the heap 300. In the event the lock is still being held by the first worker thread 170A, the second worker thread 170B may continue to acquire the lock until the first worker thread 170A releases the lock.

Upon acquiring the lock to the heap 300, the first worker thread 170A may update the heap 300 based on the first buffer 310a. For example, the first buffer 310a may include candidate elements for updating the heap 300. Accordingly, the first worker thread 170A may update the heap 300 may adding, to the heap 300, elements from the first buffer 310a until either the first buffer 310a is empty or the heap 300 reaches its threshold size of k quantity of elements. The heap 300 may be a max-heap, which may be a binary tree in which the element associated with each internal node is greater than or equal to the elements of the corresponding children nodes. As such, the root node of the heap 300 corresponds to the current top element of the heap 300.

When the heap 300 reaches its threshold size, if additional elements remain in the first buffer 310a, the first worker thread 170A may continue to update the heap 300 by comparing each remaining element in the first buffer 310a with the current top element of the heap 300. For example, if an element from the first buffer 310a is smaller than the current top element of the heap 300, the first worker thread 170A may update the heap 300 by replacing the current top element of the heap 300 with the element from the first buffer 310a (e.g., replacing the root node of the heap 300) and restoring (e.g., via a sift-down operation) the heap property that the element associated with each internal node (e.g., of the corresponding binary tree) is greater than or equal to the elements of the corresponding children nodes. Alternatively, if the element from the first buffer 310a is larger than or equal to the current top element of the heap 300, the first worker thread 170A may omit that element without any updates to the heap 300. The first worker thread 170A may continue this process until every element in the first buffer 310a have been evaluated, at which point the first worker thread 170A may release the lock on the heap 300.

Referring again to FIG. 3, the computational efficiency of a parallelized heapsort operation may be further increased by storing the current top element $v_t$ of the heap 300. For example, after the first worker thread 170A evaluated every element in the first buffer 310a but before the first worker thread 170A releases the lock on the heap 300, the first worker thread 170A may update the current top element $v_t$ of the heap 300. The current top element $v_t$ of the heap 300 may be used to prune updates to the buffer of each worker thread 170. For instance, the second worker thread 170B may add an incoming element from the second partition 320b to the second buffer 310b if that incoming element is smaller than the current top element $v_t$ of the heap 300. Otherwise, if the incoming element from the second partition 320b is larger than or equal to the current top element $v_t$ of the heap 300, the second worker thread 170B may omit that incoming element without any updates to the second buffer 310b.

In some cases, a top k query may be associated with an offset n such that the the top k query returns a k quantity of the smallest elements in the dataset starting from the n-th element. For example, when that offset n is zero, the top k query may return a k quantity of the smallest elements in the dataset. Alternatively, if the offset n is two, the top k query may return a k quantity of the smallest elements starting from the third element. To execute a top k query with an offset n, the data execution engine 150 may set the size of the heap 300 to accommodate an (k+n) quantity of elements. Moreover, the data execution engine 150 may exclude, from the result of the top k query, the first n elements in the heap. Instead, the result of the top k query with the offset n may include a k quantity of the smallest elements after the n-th element in the heap 300.

Furthermore, as noted, while a top k query executed on a dataset may return a sorted list of a k quantity of the smallest elements from the unsorted elements in the dataset, a bottom k query executed on the dataset may return a sorted list of a k quantity of the largest elements from the unsorted elements in the dataset. Accordingly, the data execution engine 150 may perform a variation of the parallelized heapsort operation in order to generate the results of a bottom k query. For example, instead of a max-heap, the heap 300 may be implemented as a min-heap, which is a binary tree in which the element of each internal node is less than or equal to the elements of the corresponding children nodes. Moreover, when updating the heap 300, the first worker thread 170A may add an element from the first buffer 310a to the heap 300 if the element is greater than the current top element of the heap 300 and omit the element without updating the heap 300 if the element is smaller than or equal to the current top element of the heap 300. Moreover, instead of storing the current top element $v_t$ of the heap 300, the current top element $v_b$ of the heap 300 may be stored and used to prune updates to the buffer of each worker thread 170.

Figure 4:
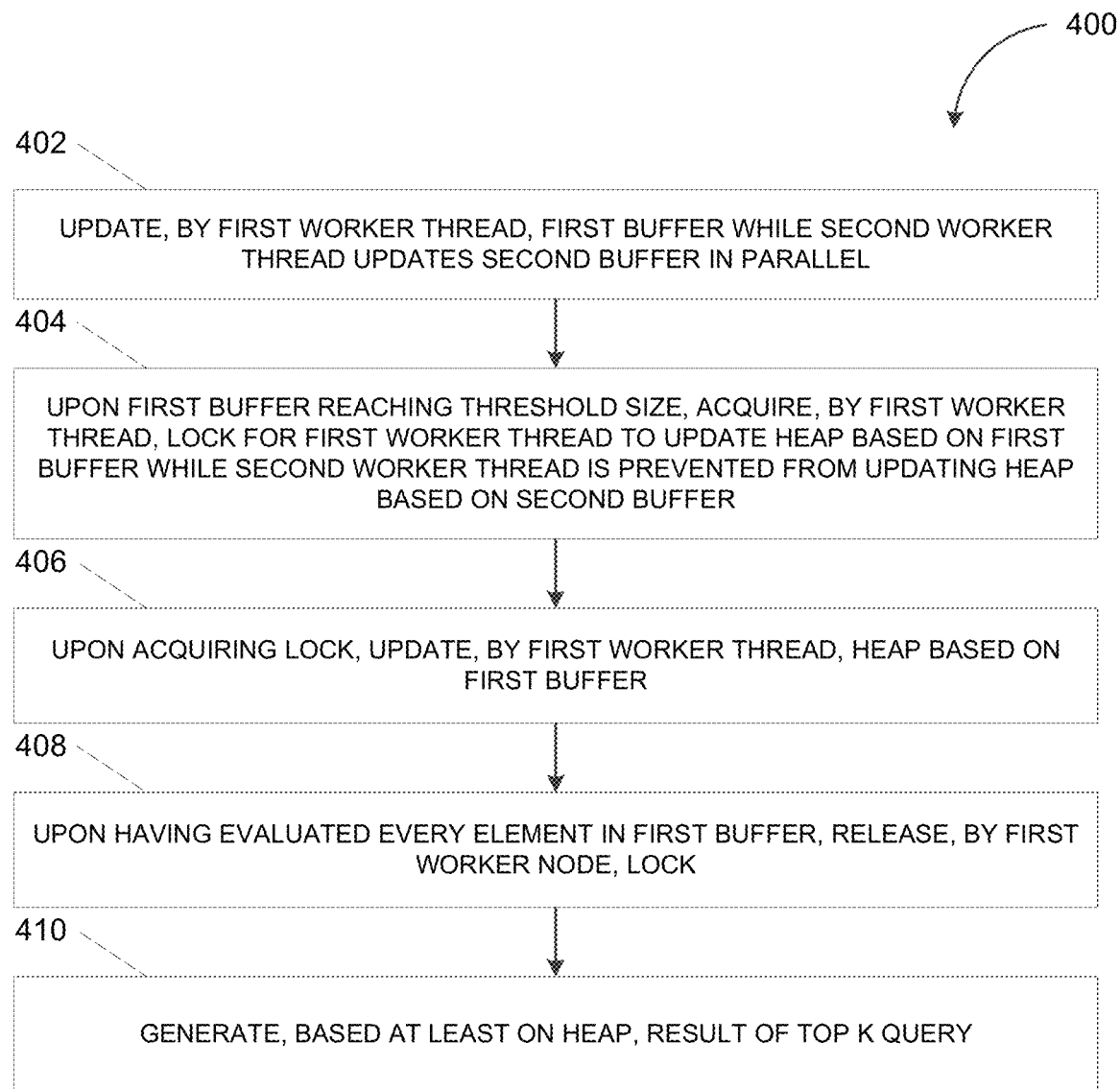
FIG. 4 depicts a flowchart illustrating an example of a process for a parallelized heapsort operation, in accordance with some example embodiments.

FIG. 4 depicts a flowchart illustrating an example of a process 400 for a parallelized heapsort operation, in accordance with some example embodiments. Referring to FIG. 4, the process 400 may be performed by the data execution engine 150, for example, by the first worker thread 170A, the second worker thread 170B, and/or the like.

At 402, the first worker thread 170A may update the first buffer 310a while the second worker thread 170B updates the second buffer 310b in parallel. For example, the first worker thread 170A may update the first buffer 310a by at least adding, to the first buffer 310a, a first plurality of elements from the first partition 320a of a dataset. Meanwhile, the second worker thread 170B may add, to the second buffer 310b, a second plurality of elements from the second partition 320b of the dataset. In some example embodiments, the updating of the first buffer 310a and the second buffer 310b may be pruned based on the current top element $v_t$ of the heap 300. For instance, the first worker thread 170A may add an element from the first partition 320a to the first buffer 310a if the element is smaller than the current top element $v_t$ of the heap 300. Likewise, the second worker thread 170B may add an element from the second partition 320b to the second buffer 310b if that element is smaller than the current top element $v_t$ of the heap 300.

At 404, the first worker thread 170A may, upon the first buffer 310a reaching a threshold size, acquire a lock for the first worker thread 170A to update the heap 300 based on the first buffer 310a while the second worker thread 170B is prevented from updating the heap 300 based on the second buffer 310b. In some example embodiments, the first worker thread 170A may continue to add elements from the first partition 320b to the first buffer 310a until the first buffer 310a reaches a threshold size and/or until the first worker thread 170A has examined every element in the first partition 320a. At that point, the first worker thread 170A may attempt to acquire the lock for updating the heap 300. Similarly, the second worker thread 170B may continue to update the second buffer 310b with elements from the second partition 320b until the second buffer 310b reaches a threshold size and/or until the second worker thread 170B has examined every element in the second partition 320b. When that happens, the second worker thread 170B may also attempt to acquire the lock for updating the heap 200. Accordingly, the first worker thread 170A acquiring the lock may prevent the second worker thread 170B from also updating the heap 300.

At 406, the first worker thread 170A may, upon acquiring the lock, update the heap 300 based at least on the first buffer 310a. For example, the first worker thread 170A may update the heap 300 by adding, to the heap 300, one or more elements from the first buffer 310a until either the first buffer 310a is empty or the heap 300 reaches its threshold size of k quantity of elements. At this point, if additional elements remain in the first buffer 310a, the first worker thread 170A may continue to update the heap 300 by comparing each remaining element in the first buffer 310a with the current top element of the heap 300. For instance, if an element from the first buffer 310a is smaller than the current top element of the heap 300, the first worker thread 170A may update the heap 300 by replacing the current top element of the heap 300 with the element from the first buffer 310a and restoring (e.g., via a sift-down operation) the heap property that the element associated with each internal node (e.g., of the corresponding binary tree) is greater than or equal to the elements of the corresponding children nodes. Alternatively, if the element from the first buffer 310a is larger than or equal to the current top element of the heap 300, the first worker thread 170A may omit that element without any updates to the heap 300. The first worker thread 170A may continue this process until every element in the first buffer 310a have been evaluated, at which point the first worker thread 170A may release the lock on the heap 300.

At 408, the first worker thread 170A may release the lock upon having evaluated every element within the first buffer 310a. In some example embodiments, the first worker thread 170A may continue to update the heap 300 based on elements from the first buffer 310a until the first worker thread 170A has examined every element in the first buffer 310a. At this point, the first worker thread 170A may release the lock on the heap 300, thus allowing another worker thread, such as the second worker thread 170B, to update the heap 300. In some cases, after the first worker thread 170A evaluated every element in the first buffer 310a but before the first worker thread 170A releases the lock on the heap 300, the first worker thread 170A may update the current top element $v_t$ of the heap 300. The current top element $v_t$ of the heap 300 may be used to prune updates to the buffer of each worker thread 170. For example, the second worker thread 170B may add an incoming element from the second partition 320b to the second buffer 310b if that incoming element is smaller than the current top element $v_t$ of the heap 300. Contrastingly, if the incoming element from the second partition 320b is larger than or equal to the current top element $v_t$ of the heap 300, the second worker thread 170B may omit that incoming element without any updates to the second buffer 310b.

At 410, the data execution engine 150 may generate, based at least on the heap 300, a result of a top k query. When the first worker thread 170A has evaluated every element in the first partition 320a and the second worker thread 170B has evaluated every element in the second partition 320b, the heap 300 may contain a k quantity of the smallest elements from the dataset. Accordingly, the data execution engine 150 may generate, based at least on the heap 300, the result of the top k query.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset; upon the first buffer reaching a threshold size, acquiring, by the first worker thread, a lock for the first worker thread to update a heap based on the first buffer while the second worker thread is prevented from updating the heap based on the second buffer; upon acquiring the lock, updating, by the first worker thread, the heap; and generating, based at least on the heap, a result of a top k query comprising a k quantity of smallest elements from the dataset.

Example 2: The system of Example 1, wherein the first worker thread updates the heap by at least adding, to the heap, one or more elements from the first buffer until the heap reaches the threshold size, upon the heap reaching the threshold size, comparing a first element remaining in the first buffer with a current top element in the heap, in response to the first element being smaller than the current top element of the heap, replacing the current top element of the heap with the first element, and in response to the first element being greater than or equal to the current top element of the heap, omitting the first element without updating the heap.

Example 3: The system of Example 2, wherein the first worker thread continues to update the heap until having examined every element in the first buffer.

Example 4: The system of any of Examples 2 to 3, wherein the first worker thread further updates the heap by at least comparing a second element remaining in the first buffer with the current top element in the heap, in response to the second element being smaller than the current top element of the heap, replacing the current top element of the heap with the second element, and in response to the second element being greater than the current top element of the heap, omitting the second element without updating the heap.

Example 5: The system of any of Examples 2 to 4, wherein the top k query is associated with an offset n, wherein the threshold size of the heap comprises a (k+n) quantity of elements, and wherein the result of the top k query includes the k quantity of the smallest elements after an initial n quantity of elements in the heap.

Example 6: The system of any of Examples 1 to 5, wherein the operations further comprise: upon having examined every element within the first buffer, releasing, by the first worker thread, the lock.

Example 7: The system of Example 6, wherein the first worker thread updates a current top element of the heap after having examined every element in the first buffer but before releasing the lock.

Example 8: The system of Example 7, wherein the first worker thread updates the first buffer by at least omitting, from being added to the first buffer, any element from the first partition that is greater than the current top element of the heap, and wherein the second worker thread updates the second buffer by at least omitting, from being added to the second buffer, any element from the second partition that is greater than the current top element of the heap.

Example 9: The system of any of Examples 1 to 8, wherein the heap comprises a max-heap in which each internal node is associated with a first element that is greater than or equal to a second element of associated with one or more corresponding children nodes.

Example 10: The system of any of Examples 1 to 9, wherein the operations further comprise: upon the second buffer reaching the threshold size, acquiring, by the second worker thread, the lock.

Example 11: The system of any of Examples 1 to 10, wherein the dataset comprises one or more database tables.

Example 12: The system of any of Examples 1 to 11, wherein the first partition of the dataset and the second partition of the dataset are stored at different nodes of a database.

Example 13: A method, comprising: updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset; upon the first buffer reaching a threshold size, acquiring, by the first worker thread, a lock for the first worker thread to update a heap based on the first buffer while the second worker thread is prevented from updating the heap based on the second buffer; upon acquiring the lock, updating, by the first worker thread, the heap; and generating, based at least on the heap, a result of a top k query comprising a k quantity of smallest elements from the dataset.

Example 14: The method of Example 13, wherein the first worker thread updates the heap by at least adding, to the heap, one or more elements from the first buffer until the heap reaches the threshold size, upon the heap reaching the threshold size, comparing a first element remaining in the first buffer with a current top element in the heap, in response to the first element being smaller than the current top element of the heap, replacing the current top element of the heap with the first element, and in response to the first element being greater than or equal to the current top element of the heap, omitting the first element without updating the heap.

Example 15: The method of Example 14, wherein the first worker thread continues to update the heap until having examined every element in the first buffer.

Example 16: The method of any of Examples 14 to 15, wherein the first worker thread further updates the heap by at least comparing a second element remaining in the first buffer with the current top element in the heap, in response to the second element being smaller than the current top element of the heap, replacing the current top element of the heap with the second element, and in response to the second element being greater than the current top element of the heap, omitting the second element without updating the heap.

Example 17: The method of any of Examples 13 to 16, wherein the top k query is associated with an offset n, wherein the threshold size of the heap comprises a (k+n) quantity of elements, and wherein the result of the top k query includes the k quantity of the smallest elements after an initial n quantity of elements in the heap.

Example 18: The method of any of Examples 13 to 17, further comprising: upon having examined every element within the first buffer, releasing, by the first worker thread, the lock.

Example 19: The method of any of Examples 13-18, wherein the first worker thread updates a current top element of the heap after having examined every element in the first buffer but before releasing the lock, wherein the first worker thread updates the first buffer by at least omitting, from being added to the first buffer, any element from the first partition that is greater than the current top element of the heap, and wherein the second worker thread updates the second buffer by at least omitting, from being added to the second buffer, any element from the second partition that is greater than the current top element of the heap.

Example 20: A non-transitory computer readable medium storing instructions, which when executed by at least one data processor, result in operations comprising: updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset; upon the first buffer reaching a threshold size, acquiring, by the first worker thread, a lock for the first worker thread to update a heap based on the first buffer while the second worker thread is prevented from updating the heap based on the second buffer; upon acquiring the lock, updating, by the first worker thread, the heap; and generating, based at least on the heap, a result of a top k query comprising a k quantity of smallest elements from the dataset.

Figure 5:
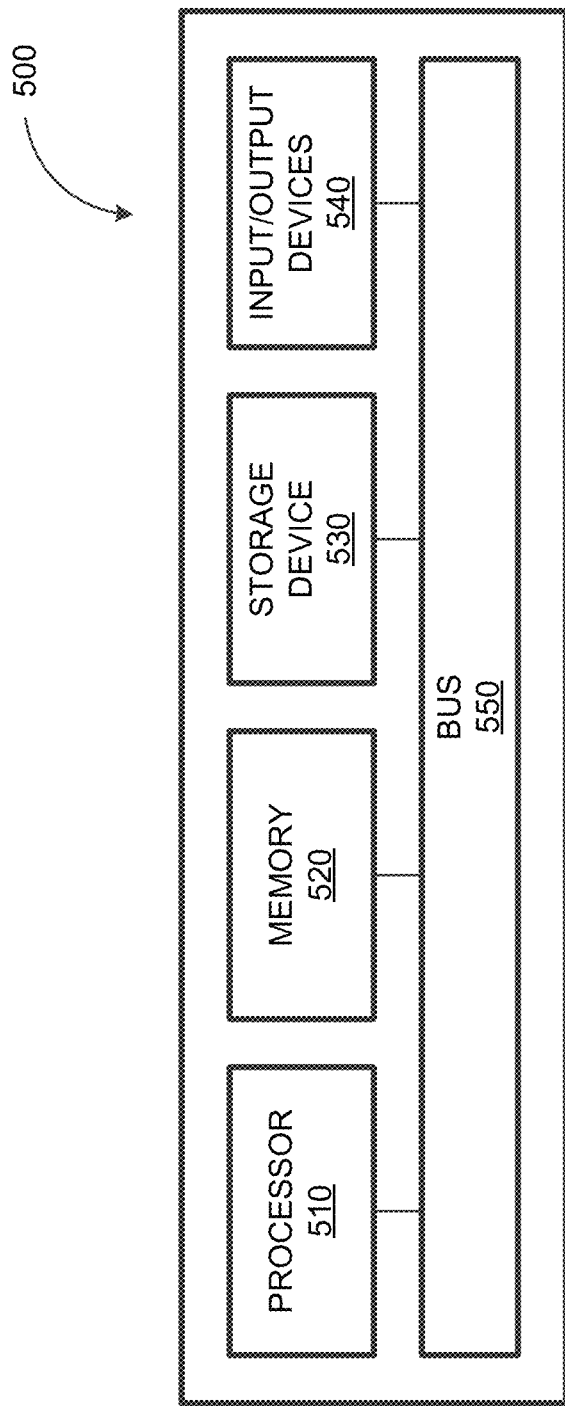
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the data execution engine 150 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the data execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset;
   upon the first buffer reaching a threshold size, acquiring, by the first worker thread, a lock for the first worker thread to update a heap based on the first buffer while the second worker thread is prevented from updating the heap based on the second buffer;
   upon acquiring the lock, updating, by the first worker thread, the heap; and
   generating, based at least on the heap, a result of a top k query comprising a k quantity of smallest elements from the dataset.

2. The system of claim 1, wherein the first worker thread updates the heap by at least
   adding, to the heap, one or more elements from the first buffer until the heap reaches the threshold size,
   upon the heap reaching the threshold size, comparing a first element remaining in the first buffer with a current top element in the heap,
   in response to the first element being smaller than the current top element of the heap, replacing the current top element of the heap with the first element, and
   in response to the first element being greater than or equal to the current top element of the heap, omitting the first element without updating the heap.

3. The system of claim 2, wherein the first worker thread continues to update the heap until having examined every element in the first buffer.

4. The system of claim 2, wherein the first worker thread further updates the heap by at least
   comparing a second element remaining in the first buffer with the current top element in the heap,
   in response to the second element being smaller than the current top element of the heap, replacing the current top element of the heap with the second element, and
   in response to the second element being greater than the current top element of the heap, omitting the second element without updating the heap.

5. The system of claim 2, wherein the top k query is associated with an offset n, wherein the threshold size of the heap comprises a (k+n) quantity of elements, and wherein the result of the top k query includes the k quantity of the smallest elements after an initial n quantity of elements in the heap.

6. The system of claim 1, wherein the operations further comprise:
   upon having examined every element within the first buffer, releasing, by the first worker thread, the lock.

7. The system of claim 6, wherein the first worker thread updates a current top element of the heap after having examined every element in the first buffer but before releasing the lock.

8. The system of claim 7, wherein the first worker thread updates the first buffer by at least omitting, from being added to the first buffer, any element from the first partition that is greater than the current top element of the heap, and wherein the second worker thread updates the second buffer by at least omitting, from being added to the second buffer, any element from the second partition that is greater than the current top element of the heap.

9. The system of claim 1, wherein the heap comprises a max-heap in which each internal node is associated with a first element that is greater than or equal to a second element of associated with one or more corresponding children nodes.

10. The system of claim 1, wherein the operations further comprising:
    upon the second buffer reaching the threshold size, acquiring, by the second worker thread, the lock.

11. The system of claim 1, wherein the dataset comprises one or more database tables.

12. The system of claim 1, wherein the first partition of the dataset and the second partition of the dataset are stored at different nodes of a database.

13. A computer-implemented, comprising:
    updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset;
    upon the first buffer reaching a threshold size, acquiring, by the first worker thread, a lock for the first worker thread to update a heap based on the first buffer while the second worker thread is prevented from updating the heap based on the second buffer;
    upon acquiring the lock, updating, by the first worker thread, the heap; and
    generating, based at least on the heap, a result of a top k query comprising a k quantity of smallest elements from the dataset.

14. The method of claim 13, wherein the first worker thread updates the heap by at least
    adding, to the heap, one or more elements from the first buffer until the heap reaches the threshold size;
    upon the heap reaching the threshold size, comparing a first element remaining in the first buffer with a current top element in the heap;
    in response to the first element being smaller than the current top element of the heap, replacing the current top element of the heap with the first element; and
    in response to the first element being greater than or equal to the current top element of the heap, omitting the first element without updating the heap.

15. The method of claim 14, wherein the first worker thread continues to update the heap until having examined every element in the first buffer.

16. The method of claim 14, wherein the first worker thread further updates the heap by at least
    comparing a second element remaining in the first buffer with the current top element in the heap;
    in response to the second element being smaller than the current top element of the heap, replacing the current top element of the heap with the second element; and
    in response to the second element being greater than the current top element of the heap, omitting the second element without updating the heap.

17. The method of claim 13, wherein the top k query is associated with an offset n, wherein the threshold size of the heap comprises a (k+n) quantity of elements, and wherein the result of the top k query includes the k quantity of the smallest elements after an initial n quantity of elements in the heap.

18. The method of claim 13, further comprising:
    upon having examined every element within the first buffer, releasing, by the first worker thread, the lock.

19. The method of claim 18, wherein the first worker thread updates a current top element of the heap after having examined every element in the first buffer but before releasing the lock, wherein the first worker thread updates the first buffer by at least omitting, from being added to the first buffer, any element from the first partition that is greater than the current top element of the heap, and wherein the second worker thread updates the second buffer by at least omitting, from being added to the second buffer, any element from the second partition that is greater than the current top element of the heap.

20. A non-transitory computer readable storing instructions, which when executed by at least one data processor, result in operations comprising:
    updating, by a first worker thread, a first buffer while a second worker thread updates a second buffer in parallel, the first worker thread updating the first buffer by at least adding, to the first buffer, one or more elements from a first partition of a dataset, and the second worker thread updating the second buffer by at least adding, to the second buffer, one or more elements from a second partition of the dataset;
    upon the first buffer reaching a threshold size, acquiring, by the first worker thread, a lock for the first worker thread to update a heap based on the first buffer while the second worker thread is prevented from updating the heap based on the second buffer;
    upon acquiring the lock, updating, by the first worker thread, the heap; and
    generating, based at least on the heap, a result of a top k query comprising a k quantity of smallest elements from the dataset.

* * * * *